(12) United States Patent
O'Farrell et al.

(10) Patent No.: US 7,577,963 B2
(45) Date of Patent: Aug. 18, 2009

(54) EVENT DATA TRANSLATION SYSTEM (75) Inventors: William J. O'Farrell, Jamestown, RI (US); Jonathan C. Bloch, Cambridge, MA (US); Christopher A. Shoemaker, West Warwick, RI (US); Peter Woo, Providence, RI (US); Miriam Goldberg, Providence, RI (US); Tibet Sprague, Providence, RI (US)

(73) Assignee: Public Display, Inc., Providence, RI (US)

( * ) Notice: Subject to any disclaimer, the term of this patent is extended or adjusted under 35 U.S.C. 154(b) by 47 days.

(21) Appl. No.: 11/648,165

(22) Filed: Dec. 29, 2006

(65) Prior Publication Data
US 2007/0220063 A1 Sep. 20, 2007

Related U.S. Application Data (60) Provisional application No. 60/755,437, filed on Dec. 30, 2005.

(51) Int. Cl.
*G06F 3/00* (2006.01)
*G06F 17/00* (2006.01)
*G06F 7/00* (2006.01)
*G06F 9/45* (2006.01)

(52) U.S. Cl. .................. 719/318; 715/236; 707/102; 717/143

(58) Field of Classification Search .......... 718/318; 715/236; 707/102; 717/143
See application file for complete search history.

(56) References Cited

U.S. PATENT DOCUMENTS

| | | | |
|---|---|---|---|
| 5,500,806 A * | 3/1996 | Bellin et al. ............ 700/298 |
| 5,855,006 A | 12/1998 | Huemoeller et al. |
| 5,864,848 A | 1/1999 | Horvitz et al. |
| 5,899,979 A | 5/1999 | Miller et al. |
| 5,945,991 A * | 8/1999 | Britt et al. ............. 715/767 |
| 6,064,975 A | 5/2000 | Moon et al. |
| 6,268,852 B1 * | 7/2001 | Lindhorst et al. ........ 715/744 |
| 6,268,952 B1 | 7/2001 | Godil et al. |
| 6,380,959 B1 | 4/2002 | Wang et al. |
| 6,388,772 B1 | 5/2002 | Williams |
| 6,480,830 B1 | 11/2002 | Ford et al. |

(Continued)

OTHER PUBLICATIONS

Lafferty, et al. "Conditional Random Fields: Probabilistic Models for Segmenting and Labeling Sequence Data", date 2001.

(Continued)

*Primary Examiner*—Lechi Truong
(74) *Attorney, Agent, or Firm*—Muirhead and Saturnelli, LLC (57) ABSTRACT An event translator system for receiving input information, parsing event data on the input information to produce a result event data set and generating an event list based on an analysis of the event the result data set, performing an event listing and displaying event list to a user interface module. The event translation system translating event data also include receiving user feedback on the event listing and using the user feedback to improve subsequent operations of at least one harvesting algorithm. Translating event data also includes at least two harvesting algorithms for performing the input information to generate a plurality of result event data sets and creating an event listing for display to a user interface module based on an analysis of the plurality of result event data sets.

17 Claims, 7 Drawing Sheets

U.S. PATENT DOCUMENTS

| | | |
|---|---|---|
| 6,516,308 B1 | 2/2003 | Cohen |
| 6,640,230 B1 | 10/2003 | Doss et al. |
| 6,675,356 B1 | 1/2004 | Adler et al. |
| 6,728,530 B1 | 4/2004 | Heinonen et al. |
| 6,732,102 B1 | 5/2004 | Khandekar |
| 6,829,745 B2 * | 12/2004 | Yassin et al. ................ 715/236 |
| 6,845,370 B2 | 1/2005 | Burkey et al. |
| 6,879,996 B1 | 4/2005 | Laves |
| 7,003,735 B2 | 2/2006 | Edlund et al. |
| 7,027,975 B1 * | 4/2006 | Pazandak et al. ................ 704/9 |
| 7,237,265 B2 * | 6/2007 | Reshef et al. ................ 726/25 |
| 2002/0078070 A1 | 6/2002 | Eshelman et al. |
| 2003/0028631 A1 * | 2/2003 | Rhodes ....................... 709/224 |
| 2003/0172348 A1 * | 9/2003 | Fry et al. ..................... 715/513 |
| 2004/0034635 A1 * | 2/2004 | Czarnecki et al. ............... 707/7 |
| 2004/0034830 A1 * | 2/2004 | Fuchs et al. ............... 715/501.1 |
| 2006/0025987 A1 * | 2/2006 | Baisley et al. .................. 704/4 |
| 2006/0080360 A1 * | 4/2006 | Young et al. .............. 707/104.1 |

OTHER PUBLICATIONS

McCallum, et al. "Maximum Entropy Models for Information Extraction and Segmentation", date 2000.

* cited by examiner

EVENT DATA TRANSLATION SYSTEM

CROSS REFERENCE TO RELATED APPLICATIONS

This application claims priority to U.S. Provisional App. No. 60/755,437, filed Dec. 30, 2005, and entitled "Community Calendaring," which is incorporated herein by reference.

TECHNICAL FIELD

This application is related to the field of information translation and, more particularly, to a system for translating and organizing calendar and other event data among various data formats.

BACKGROUND OF THE INVENTION

Many computer users rely on personal information management ("PIM") software to keep track of contact and event information and learn about event information through digitally publicized calendars and lists of events, which may be, for example, posted on websites, distributed in emails or exist as file attachments. Known systems for extraction and management of calendar data and other information include U.S. Pat. No. 6,732,102 to Khandekar, U.S. Pat. No. 6,675,356 to Alder, et al., U.S. Pat. No. 6,516,308 to Cohen, and U.S. Pat. No. 6,388,772 to Williams, all of which are incorporated herein by reference. However, digital calendars and event lists may have a variety of visual formats that are perfectly understandable to human readers, but which may be generally incomprehensible to PIM software. As a result, viewers and recipients of event information from a digital calendar or list may be forced to manually enter information from multiple events into their PIM software. Similarly, if a user desires to move such event data to another digital calendar or list—for example on a different website—the user may also have to manually enter the event data.

Accordingly, it would be desirable to provide for a system that facilitates the translation of event data from digital calendars having multiple display formats—publicized, for example, in webpages, emails, and stand-alone files—to PIM software, web pages or other data format type.

SUMMARY OF THE INVENTION

According to the system described herein, an event data translation system includes an interface that receives input information. At least one harvesting algorithm parses the event data from the input information to generate a result event data set. An analyzer analyzes the result event data set output from the at least one harvester and selects at least a portion of the result event data set as a selected result event data set. A processing component then processes the selected result event data set to generate an event listing. The system may further include at least two harvesting algorithms that each parses event data from the input information to each generate a result event data set, wherein the analyzer analyzes the plurality of result event data sets and selects at least a portion of the plurality of result event data sets as the selected result event data set.

According further to the system described herein, an event data translation system includes an interface that receives input information, at least one harvester that parses event data from the input information to generate at least one result event data set, an analyzer that analyzes the result event data set output from the at least one harvester and selects at least a portion of the result event data set as a selected result event data set, and a processing component that processes the selected result event data set to generate an event listing. The event translation system may also include a controller coupled to at least one of the at least one harvesters, the analyzer and the processing component. The event translation system may also include a pre-selector that selects the at least one harvester as a subset from a larger set of harvesters. The event translation system may also include a statistical analyzer that analyzes use of the event listing. At least one harvester may include a harvester of a type that is at least one of: a table grammar harvester, a tree grammar inference harvester, and a two-tiered probabilistic harvester. The interface may display the event listing. The interface may be a user interface. The input information may be at least one of: an e-mail, a webpage, a text file and a pdf file. The event translation system may also include at least one of: an HTML receiver and an HTML converter, where the input information is either received in an HTML format by the HTML receiver or converted into an HMTL format by the HTML converter. The event translation system may also include a monitor that monitors changes in a source of the input information. The event translation system may also include at least two harvesters that each parses event data from the input information to each generate a result event data set as a plurality of result event data sets, where the analyzer analyzes the plurality of result event data sets and selects at least a portion of the plurality of result event data sets as the selected result event data set. The at least two harvesters may include a harvester of a first type having a first setting and a harvester of the first type having a second setting, the first setting being different from the second setting.

According further to the system described herein, translating event data includes receiving input information, performing at least one harvesting algorithm on the input information to generate a result event data set, selecting at least a portion of the result event data set based on an analysis of the result event data set as a selected result event data set, and generating an event listing from the selected result event data set. Translating event data may also include pre-selecting the at least one harvester algorithm as a subset from a larger set of harvesting algorithms. Translating event data may also include analyzing use of the event listing. The at least one harvesting algorithm may include a harvesting algorithm of a type that is at least one of: a table grammar harvesting algorithm, a tree grammar inference harvesting algorithm, and a two-tiered probabilistic harvesting algorithm. Translating event data may also include displaying the event listing. Translating event data may also include receiving user feedback on the event listing and using the user feedback to improve the at least one harvesting algorithm. The input information may be at least one of: an e-mail, a webpage, a text file and a pdf file. Translating event data may also include at least one of: receiving the input information in an HTML format and converting the input information into an HTML format. Translating event data may also include monitoring changes in a source of the input information. Translating event data may also include performing at least two harvesting algorithms on the input information to generate a plurality of result event data sets and selecting at least a portion of the plurality of result event data sets based on an analysis of the plurality of result event data sets as the selected result event data set.

A system may include at least one processor that performs any of the steps described herein.

According further to the system described herein, extracting event information includes receiving source information, processing the source information to generate processed source information, harvesting the processed source information to generate result event information, and outputting the result event information. Processing the source information may include breaking the source information into data chunks and harvesting the processed source information may include includes tokenizing the data chunks, parsing the tokenized data chunks into a data structure, and extracting the result event information from the tokenized and parsed data chunks. Processing the source information may include creating a tree structure, and harvesting the processed source information may include includes traversing the tree structure to identify event information portions, marking locations of identified event information portions with tokens on the tree structure, identifying a tree grammar using at least some of the tokens as selected tokens, and associating text with the selected tokens according to the identified tree grammar to generate the result event information. Processing the source information may include classifying text from the source information according to pre-selected features to generate classified text, assigning weights to the classified text based on use of a training data set to identify event information portions, and harvesting the processed source information may includes associating identified event information portions according to pre-selected association features to generate the result event information.

BRIEF DESCRIPTION OF THE DRAWINGS

Embodiments of the system are described with reference to the several figures of the drawings, in which.

DETAILED DESCRIPTION OF VARIOUS EMBODIMENTS

Referring now to the figures of the drawings, the figures comprise a part of this specification and illustrate exemplary embodiments of the described system. It is to be understood that in some instances various aspects of the system may be shown schematically or may be shown exaggerated or altered to facilitate an understanding of the system.

Figure 1:
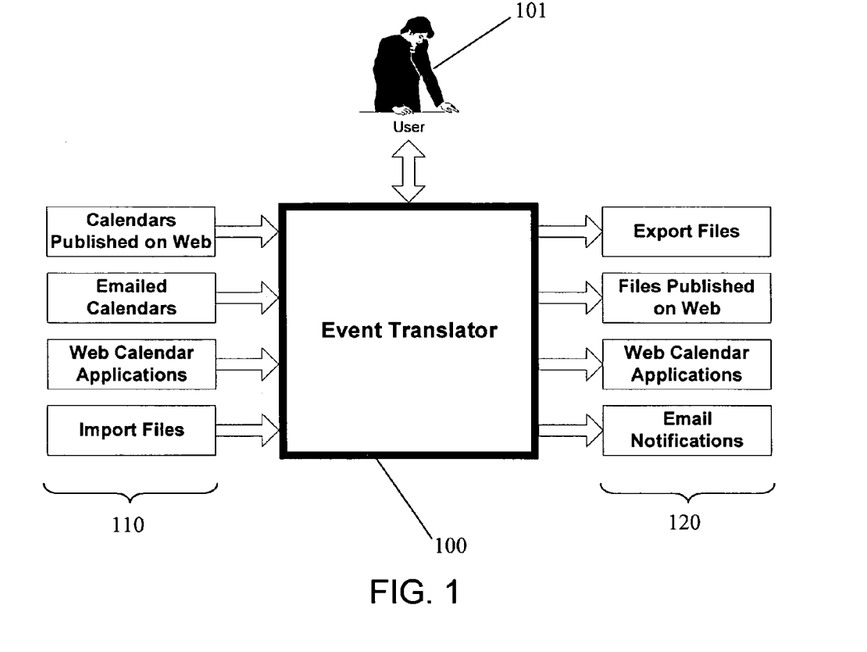
FIG. 1 is a schematic illustration showing an event translator system according to an embodiment of the system described herein.

FIG. 1 is schematic illustration showing the functional context of an event translator system 100 according to an embodiment of the system described herein. The event translator system 100 may perform at least three tasks: (1) extract or "harvest" date, time, description, and other event information from digital data 110 generated for human reading, such as calendars and/or event lists published on the web, emailed calendars, web calendar applications and imported files, among others; (2) present the extracted event data to a user 101 for modification, management, and monitoring; and (3) export the events to PIM software, web pages and/or application programming interfaces (APIs) in appropriate data formats 120. The event translation system 100 may be incorporated into a web site that is accessed by the user 101 who enters a desired web address for event translation or otherwise transmits the digital data 110 for translation. The web site may then access the webpage of the entered web address, and/or receive the transmitted digital data 110, and perform the event translation operations as further described herein. The web site having the event translation system 100 implemented therein may, for example, be provided as a subscription service. Alternatively, the event translation system 100 may be incorporated into a webpage being visited by a user as a browser plug-in that provides a user-selectable option to extract event information from the webpage. Other implementations are possible, including incorporation into desktop software, enterprise software on a server, and plug-ins for e-mail or other applications, among others.

Figure 2:
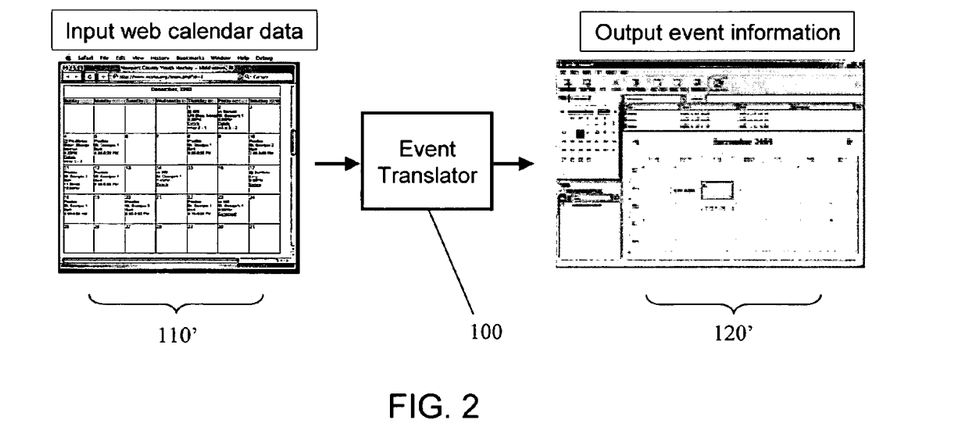
FIG. 2 is a schematic illustration of the event translator system translating event information between graphical displays according to an embodiment of the system described herein.

FIG. 2 is a schematic illustration of the event translation system 100 translating event information according to an embodiment of the system described herein. As shown, digital data in the graphical format of a calendar web page 110' is harvested and converted into a standardized format that is readable by PIM software and displayable as output event information 120'. The output event information 120' is shown as a PIM software calendar display, but may also be calendar information or other event information displayed on a web page or in some other data format.

Harvesting may be relatively computationally complex. Humans have a number of normative ways to express sets of events—including event lists, date planner matrices, month views, and week views, among others—all of which may need to be recognized and interpreted by the event translator system. In addition, the way in which those formats are codified into documents may make visual sense to a reader, but cause interpretation problems for a software program. For example, two adjacent tables in a webpage may visually provide nearly identical information as that of one larger table, but to a software heuristic attempting to extract a set of events, those two representations may need to be handled differently. In addition, each document format may also present its own unique set of challenges. For example, webpages encoded using hypertext markup language ("HTML") may contain malformed HTML code that does not conform to the standards set by the World Wide Web Consortium and which may require different translation techniques.

The event translator system may include a set of features that enable users to compare the harvested set of events to the original source calendar, then edit, manage, and monitor that set. The event translator system's user interface may be designed to present those features in an intuitive and elegant fashion. The event translator system may also be designed to operate correctly through virtually all modem web browsers. In addition, the event translator system may be able to modify and adjust its internal representation of the event data to conform to the different event representations used by different PIM applications and/or web software. These differences include variations in date, time, and time zone representations, discrepancies in whether or not all-day events or events with no end time are acceptable, and diversity in the names and intent of data fields like description, summary, and location.

In the course of performing the tasks described above, the event translator system may also gather usage data and may generate statistics from that data to help the harvesting algorithm improve its performance and to provide a concrete overview of user behavior. For example, the event translator system may generate statistics on the popularity of various harvested pages by date or time and by geographic region. The system may also track which harvested documents are typically harvested by the same user, and which PIM formats, APIs and/or other data format are the most popular amongst certain types of users. The system may track which events users have edited and use that information to automatically improve harvesting performance.

Figure 3:
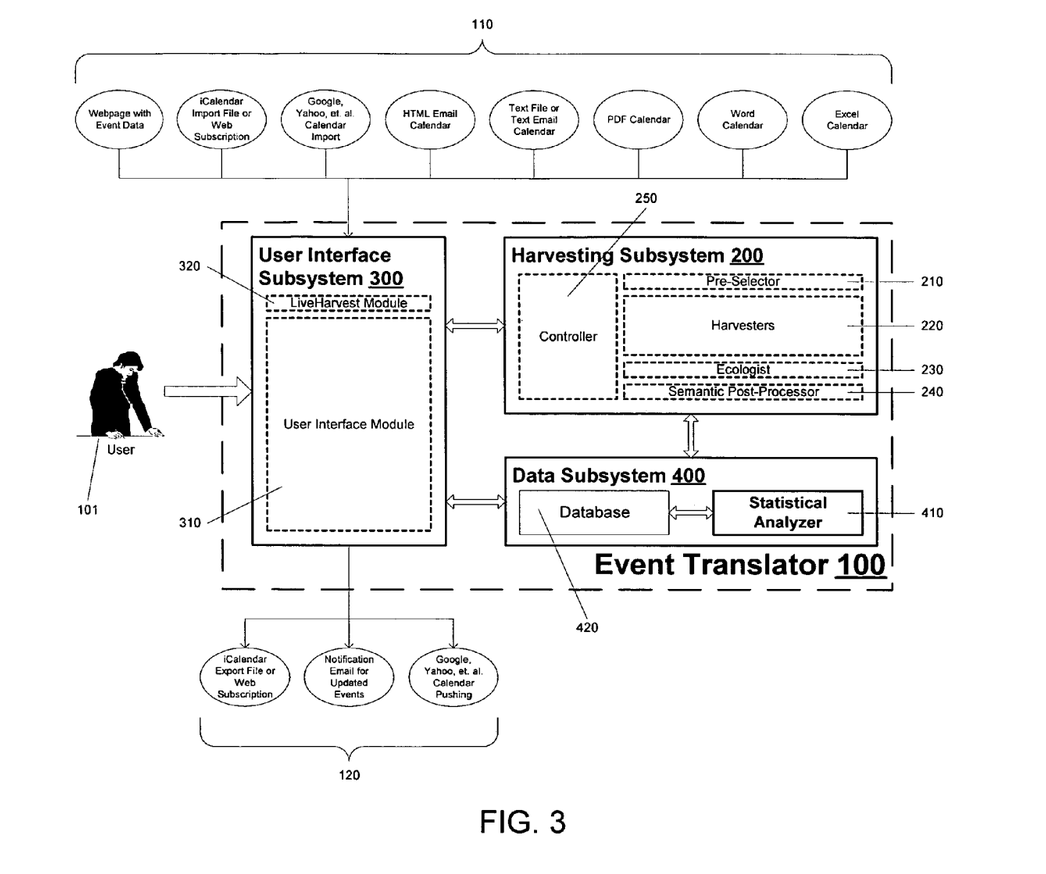
FIG. 3 is a schematic illustration of software architecture components for the event translator system according to an embodiment of the system described herein.

FIG. 3 is a schematic illustration of software architecture components for the event translator system 100 according to an embodiment of the system described herein. In the illustrated embodiment, the event translator system 100 includes three subsystems: a harvester subsystem 200, a user interface subsystem 300, and a data subsystem 400. The three subsystems may embody seven processing components that are identified as follows and further described elsewhere herein:

As part of the harvester subsystem 200:
(1) A pre-selector / pre-processor component 210 that: a) prepares the source document for analysis, b) computes a series of measurements from the source document, and c) selects one or more harvesting techniques and harvesting parameters to use for the particular input document ("pre-selector").
(2) A series of harvester components 220 that extract date, time, description, and other information from input documents based on the structure of the page and the context of various text elements ("harvesters"). Each harvester may use different combinations of lexical, syntax, and semantic analysis and manipulation algorithms to identify the set of events contained in the original file.
(3) An ecologist component 230 that scores the output of each harvester component and generates an event set most likely to be correct, based on the attributes of the input document, the output of each harvester component and/or the historical performance of harvester components.
(4) A semantic post-processor component 240 that uses semantic analysis techniques to extract the summary, location, status, price, contact, and other information from the event description ("semantic post-processor"). The semantic post-processor 240 may also perform clean-up operations on the event data, such as by eliminating unnecessary text and punctuation marks from each description.

As part of the user interface subsystem 300:
(5) A user interface 310 that enables users to select input documents, then modify, manage, and export events ("user interface").
(6) A monitoring component 320 that may repeatedly check webpages for new and updated events and alert the user of such changes on an event-by-event basis ("live harvest module").

As part of the data subsystem 400:
(7) A statistical analyzer component 410 that collects and analyzes statistics in order to produce data on user behavior ("statistical analyzer"). The statistical analyzer 410 may store information in and retrieve information from a database 420. Note that although the database 420 is shown as part of the data subsystem 400, the database 420 may be incorporated as a stand-alone unit and/or as part of any of the other subsystems in the event translation system 100.

Figure 4:
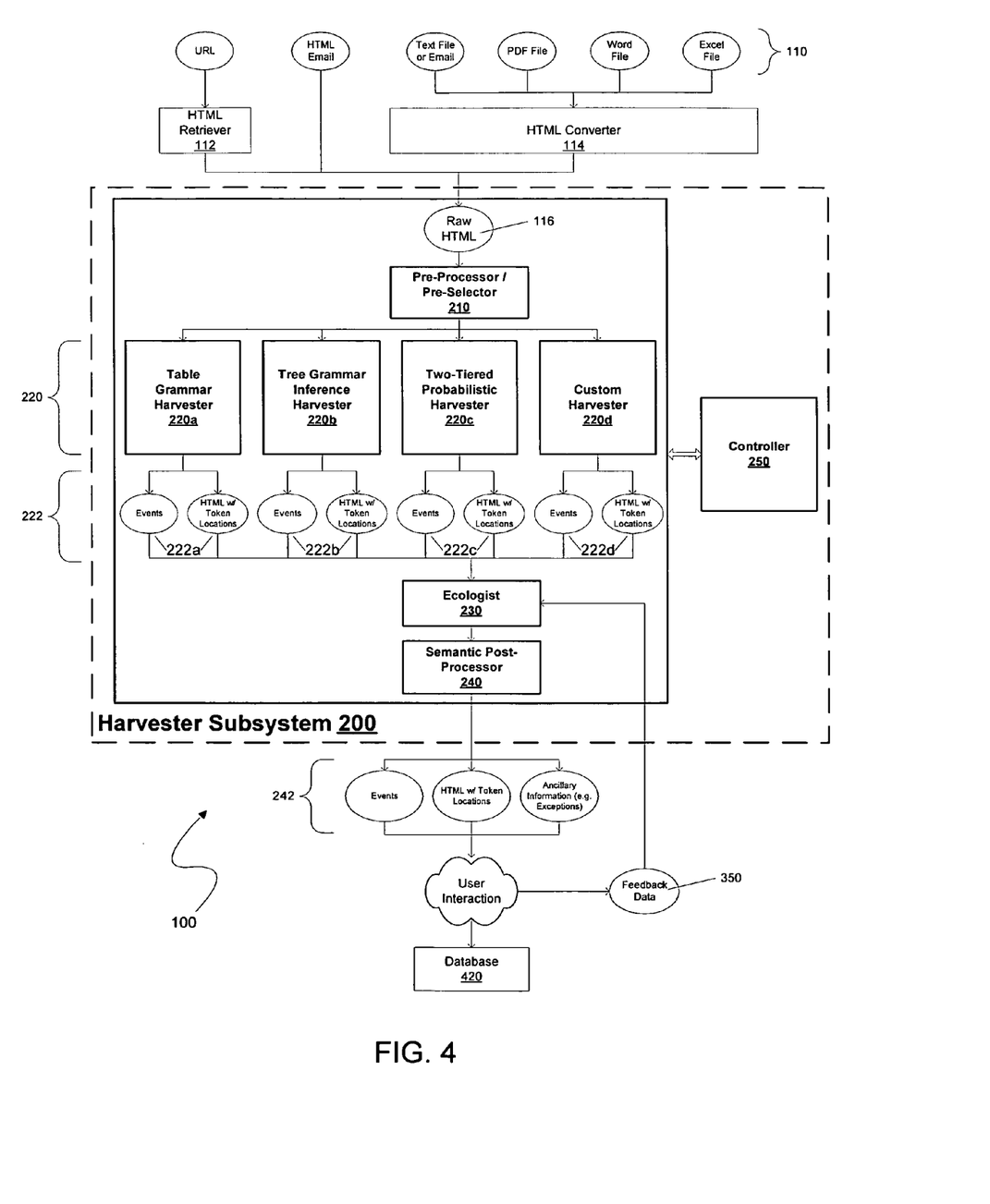
FIG. 4 is a schematic illustration of the harvester subsystem of the event translator system according to an embodiment of the system described herein.

FIG. 4 is a schematic illustration of the harvester subsystem 200 of the event translator system 100 according to an embodiment of the system described herein. As shown, the harvester subsystem 200 may convert raw HTML data 116 into a set of events and associate those events with portions of text within the HTML code. In the embodiment shown, the data provided as input to the harvester subsystem 200 is the raw HTML data 116 that was either retrieved as, transmitted as or converted into the raw HTML data 116 from the input digital data 110. For example, the input digital data 110 may be transmitted as HTML data 116 as an email, and/or an HTML retriever 112 may generate the HTML data 116 in the case of a web page, and/or an HTML converter 114 may be used to convert data into HTML data 116 from other data formats (such text e-mails, pdf files, word files, excel files, screen captures and/or other non-HTML file types). It should be noted, however, that the system described herein may be adapted in a straight-forward manner to receive data in other input formats besides HTML data, such as Delimited Text Files, word-processor files, spreadsheet files, syndication feeds, and calendar-data formats (iCal, hCal), among others.

The harvester subsystem 200 may include the pre-processor/pre-selector 210, a series of harvesters 220 (identified as separate harvester components 220a-220d, as detailed elsewhere herein), the ecologist 230 and the semantic post-processor 240. The harvester subsystem 200 may also include a controller 250 that manages the harvesting process by controlling the other components 210, 220, 230, 240 of the harvester subsystem 200. As further described herein, although the harvester subsystem 200 may operate with only one harvester in some cases, in other cases the use of multiple harvesters using different approaches may provide a more accurate and robust result than a single harvester attempting a monolithic approach. Each raw HTML page (or other data format, as described herein including excel files, pdf files, word-processor files and/or text files, among others) may be evaluated by several harvesters that produce a series of result data sets 222. Each harvester produces a result data set 222a-222d that may include a result event list with event data and may include HTML data with token locations. As further described elsewhere herein, one of the result data sets 222a-222d may be selected by the ecologist 230 as likely to be the most accurate and which may then be further processed by the semantic post-processor 240 to yield a processed result data set 242 that includes a selected result events list and ancillary information.

The ancillary information that accompanies the processed result data set in 242 may include a list of exceptions encountered by the Harvester Subsystem. These exceptions indicate that the result data set maybe considered to be erroneous or anomalous in some way. For example, an exception may indicate the erroneous condition that the source document is unreachable because the Web server hosting that document is not responding to requests for that document. As another example, an exception may indicate the anomalous condition that the source document did not contain information sufficient to determine the year of the events described therein. The event translator application may act upon any exceptions that accompany the result data set in 242. For example, the event translator application may discard any results that are accompanied by an exception that indicates a severe failure, or the event translator application may initiate additional user interaction in response to an exception that indicates an anomalous condition.

The processed result data set 242 may be returned to the user through the user interface subsystem 300, and/or analyzed by the data subsystem 400 (see FIG. 2). The user interface subsystem 300 and/or statistical analyzer subsystem 400 may provide feedback data that may be transmitted to the ecologist 230 to provide further information that may facilitate improved selection and processing of harvester result event data in subsequent operations.

The harvesting process may begin after the user has identified a source document or series of source documents to be harvested through the user interface 310 of the user interface subsystem 300. As further discussed elsewhere herein, the source document may be transmitted as or converted into raw HTML data. As an initial harvesting step, the pre-selector 210 may perform an analysis to determine a suitable set of harvesters for extracting the event data from a web page, email, input file or other calendar-style data type. A set of harvesters may include one or more harvesters selected as a subset of all available harvesters 220 (for example, a harvester subset comprising the harvester 220a and/or a harvester subset comprising the harvesters 220b and 220c and/or a harvester subset comprising multiple variations of the harvester 220d, each of the illustrated harvesters being further described elsewhere herein). As further described elsewhere herein, the pre-selector may analyze the raw HTML page and determine which harvesters to use and/or which sets of parameters to use with each harvester. Parameters may include: the assumed table depth of an event, where zero may mean that the event is not in a table; how many line breaks constitute a new event; which data formats to look for; the visual format of the presented calendar; document length; quantity and format of dates and times; (natural) language of document text; and/or original document data type if converted, among other parameters.

In an embodiment, the pre-selector 210 may include a pre-processor component the provides pre-processing functionality as described herein. Alternatively, the pre-processor may be a stand-alone component. The pre-processor may perform a series of functions on the source URI. The pre-processor may download the source, create a copy of the HTML for display in the application, and extract a set of features from the source, according to an extensible list of feature functions. Such features may include: the top-level domain of the URI, the dimensions of the tables, the number of frames on the page, the depth of the DOM, etc. These features are returned and passed forward on and/or within the pre-selector and on to the harvesters. In an embodiment, the pre-processor may include the HTML converter 112 and/or the HTML retriever 114 (see FIG. 4).

In another embodiment, as part of an initial test, the pre-selector 210 may determine which specific program produced a particular calendar, event list and/or a similar unique set of characteristics and select one or more harvesters that are specifically directed to translation of event data from that particular calendar program, event list program and/or other program. If the pre-selector 210 does identify the specific program or unique set of characteristics that produced certain calendar and/or event information, then it may be that only one custom harvester 220d is used. To determine a specific program, the pre-selector 210 may search metadata headers in a web page for a program name, text on the page that may identify the program and/or comments on the web page, among other text search techniques. The pre-selector 210 may also search the URL address of the domain where the page is from which may yield company information that may indicate the particular program used to produce the calendar information.

Alternatively, other tests may be performed by the pre-selector 210 in an attempt to characterize the format of the calendar data and determine an appropriate set of harvesters based on the characterization of the data. For example, the pre-selector 210 may determine structural information of the data, such as number of tables, numbers of cells in tables; and numbers of columns and rows, among other data structure information. In this way, the pre-selector may determine the type of calendar data such as, for example, that of a monthly calendar or a daily calendar. Further, in another possible test, the pre-selector 210 may determine the number of or type of dates that are listed in the data and use this information to select an appropriate harvester. For example if a multiple year spanning date is recognized, such as "2006-2007", the pre-selector may determine that the calendar information is for a sport or academic calendar and select an appropriately custom harvester 220d for sport or academic calendars. A sport or academic calendar custom harvester 220d may be configured to recognize that, for example, the appearance of the month "January" or "February" in relation to an event would indicate that the event always occurs after an event identified as occurring in "November" or "December".

After the pre-selector 210 has selected an appropriate set of harvesters, control passes to the subset of harvesters selected from the series of harvesters 220. Harvesters may include algorithms that identify events from the raw HTML data and output the identified events in a result event list. As further described elsewhere herein, a harvester may analyze the raw byte-stream of a source document, such as a web page or digital document, for event information. Then, the harvester parses the source document to convert the data of the source document from the concrete syntax of the raw HTML or other digital representation to a clearly defined abstract syntax. The parsing process may discard non-important data (for example, nonevent data) and identify the events in the source document as "harvests" or "harvested data".

Subsequently, the harvester may then output a list of the harvested data to the ecologist 230 and the semantic post processor 240, as further described elsewhere herein. As discussed above, the event translator system architecture accommodates application of one or multiple harvesters and may include harvesters that are both general (designed to cover broad representations of event information) and specialized (designed to cover particular or idiosyncratic representations of event information). Various embodiments of harvesters are described below.

In an embodiment, one type of harvester may be known as the Table Grammar harvester ("TG harvester") 220a. The TG harvester 220a uses a deductive method which incorporates prior knowledge about the grammar of an event list into the parser. The TG harvester 220a parses the source document into a stream of tokens, where each region of the source document is classified as representing a type of data, e.g. Date, Text, Break, etc. The parsing process includes specialized interpretation of tables, such that text in a table cell is associated with the date indicated by that cell. The parser iterates through the token-stream, accumulating each event sequentially.

Figure 5:
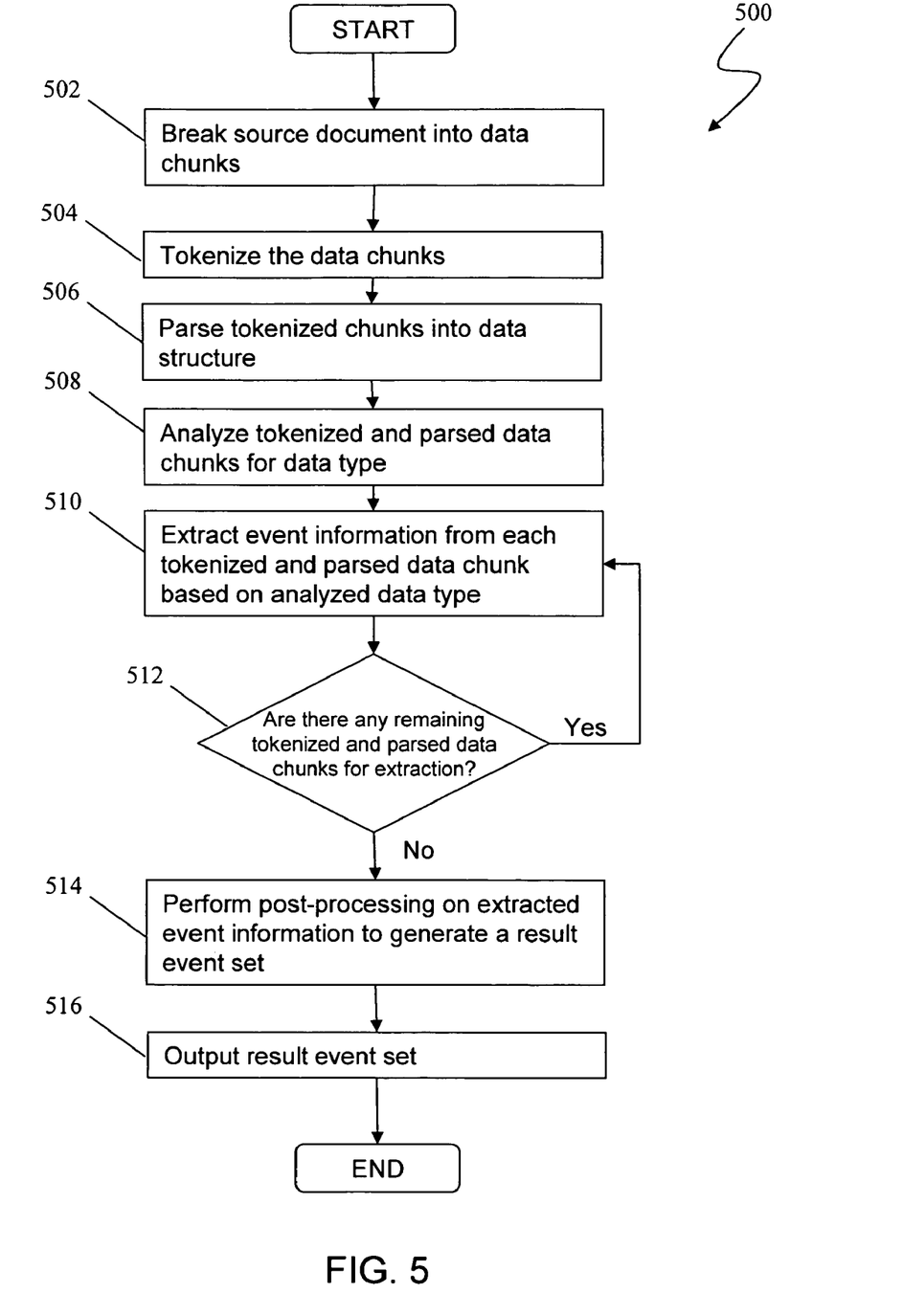
FIG. 5 is a flow diagram showing operation of the Table Grammar harvester according to an embodiment of the system described herein.

FIG. 5 is a flow diagram 500 showing operation of the TG harvester 220a according to an embodiment of the system described herein. In a step 502, the source document (either transmitted as or converted into HTML data) may be broken into chunks in which data from tables are characterized as one type of chunk (table chunk) and data between tables is characterized as another type of chunk (non-table chunk). After step 502, control passes to a step 504 at which each of the chunks (table and/or non-table) is tokenized. After the step 504, control passes to a step 506 at which each of the tokenized chunks are parsed into a traversable data structure, such as a tree structure of branches (connectors) and leaves (nodes). The data stored in the tree may be traversed to recreate the data as ordered on the source document page.

Control then passes to a step 508, in which each tokenized and parsed data chunk structure is analyzed for the type of data that it may contain. The analysis may be a heuristic analysis in which each chunk tree is identified by data type such as whether the data is column data, row data, matrix data or month data, as will now be further described. Note that other data types besides those identified below may identified as part of the heuristic analysis.

Column data is characterized by the appearance of an event in a column of a table in which there may be one date per column. For example, a date may appear in a column header of the table and associated with multiple events.

Row data is characterized by the appearance of one event per row of a table. This is the typical format for identification of events as a list and, consequently, may be used as a default analysis type. For example, non-table data chunks may be treated as a row data type.

Matrix data is characterized by a table where column headers and row headers contribute to the interpretation of an event described in a table cell. For example, row headers contain actual text of an event, column headers contain year of the event, and interior cells contain day in year of the event described in the column header. The matrix data type may be identified if dates appear in interior cells of a table and date fragments appears in the table headers.

Month data is characterized by a typical calendar view in which the overall shape of the table determines interpretation of the date, that is day numbers appearing in the text of table cells are associated with the month and year identified elsewhere. The month data type may be identified by a table having five rows and seven columns (35 boxes).

After the step 508, processing proceeds to a step 510 in which event information is extracted from the tokenized and parsed data chunks. The algorithm used to extract the data may involve an iteration through the tree chunk structure and depend on the table type identified from the heuristic analysis of the step 508 (column data, row data, matrix data, month data, etc.) After each iteration of the step 510, a test step 512 assess whether there are any further tokenized and parsed data chunks from which data is to be extracted. The result of the iterative processing of step 510 is a compilation of event list information. If there are no further tokenized and parsed data chunks for extraction, then after test step 512, control proceeds to a step 514 in which the event list information is processed ("cleaned up") according to desired post-processing techniques and according to established rules to generate a result event set. For example, events listed in the source document an event recurring on multiple days may be listed in the result event set as separate events. Events identified in the source document as occurring at times that span multiple days (for example, 10 PM-1 AM) may be correctly identified as an event occurring over multiple days. Further, for example, if an event in the result event set is identified as occurring at a time for which AM or PM is not specified, assumption rules may apply depending on the times identified, such as a listing of "1-3" may be assumed as a PM entry. After the step 514, control proceeds to a step 516 at which the result event set may be output for evaluation by the ecologist 230, as described elsewhere herein. After the step 516 processing is complete. The steps described above may be implemented via executable code stored on a computer-readable medium and/ or as a system with at least one processor to perform the above-noted steps.

Another type of harvester may be known as the Tree Grammar Inference harvester ("TGI harvester") 220*b*. The TGI harvester 220*b* uses an inductive method in which an algorithm infers the tree grammar used in a particular source document based on prior knowledge about how an event list usually appears. The TGI harvester may operate on the Document Object Model (DOM) tree created by an industry-standard HTML parser. The TGI harvester accomplishes the harvesting task by repeatedly traversing the DOM tree, adding annotations, changing information and/or manipulating tree structure, as further described below.

Figure 6:
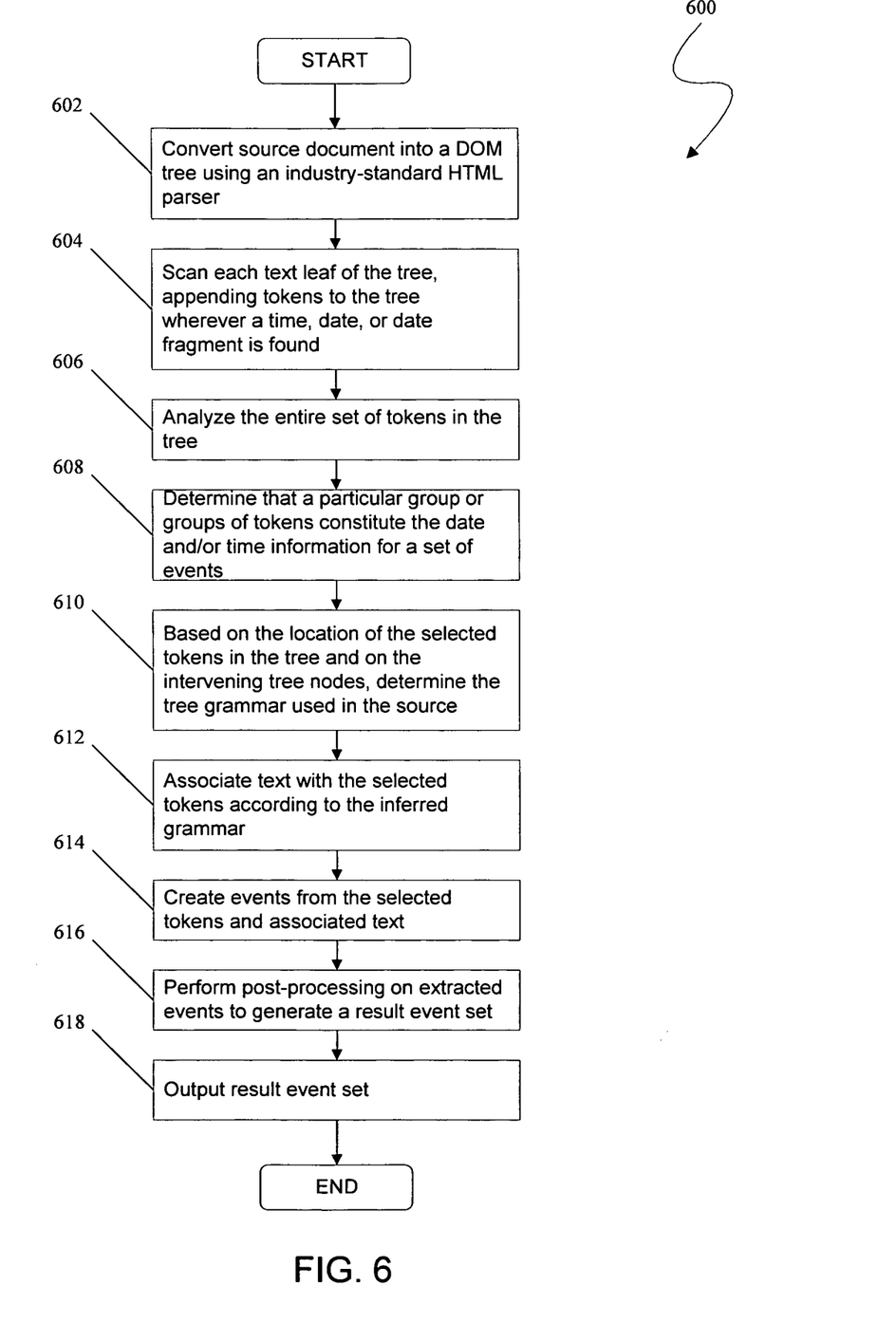
FIG. 6 is a flow diagram showing operation of the Tree Grammar Inference harvester according to an embodiment of the system described herein.

FIG. 6 is a flow diagram 600 showing operation of the TGI harvester 220*b* according to an embodiment of the system described herein. In a step 602, the TGI harvester 220*b* uses an industry-standard HTML parser to create from a source document the DOM tree that will be subsequently traversed. After the step 602, control passes to a step 604, wherein the TGI harvester 220*b* traverses the entire DOM tree, scanning each text string in leaves of the tree for characters that might represent a time, a date, some range of times or dates, some fragment of a time or date, or some other word or phrase that might represent an important attribute of an event. Whenever such a sub-string is detected, the TGI harvester 220*b* decorates the tree leaf where the sub-string is detected with a token marking the location of the sub-string and its likely meaning.

After the step 604, control passes to a step 606, wherein the entire DOM tree is again traversed. In this traversal, the TGI harvester 220*b* examines the attributes each of the tokens created in the step 604 and groups them into clusters based on similarity of attributes. Control then passes to a step 608 at which the TGI harvester 220*b* determines, or otherwise infers, that a particular group or groups of tokens constitute the date and/or time information for a set of events. This inference is based on the properties of the group and on the attributes, computed in step 606, of the tokens that comprise each group. Two main assumptions that may guide the inference that a particular group of temporal tokens are definitive for a set of events are:

1) the principle of regularity—that, in the expression of a particular set of events, the definitive dates and times for all events in the set will have some characteristics in common. These common characteristics may be typographic (e.g., color, font family, font size), contextual (e.g., proximate words or symbols), or structural (e.g., column or row position, table depth).

2) the principle of emphasis—that, in the expression of a particular set of events, the definitive dates and times will be visually emphasized relative to non-definitive dates and times. For example, a date with a larger font size or heavier font weight is more likely to be definitive for an event than a less emphasized date or time.

After the step 608, control then passes to a step 610 at which, based on the location of the selected tokens in the tree and on the intervening tree nodes, the TGI harvester 220*b* determines, or otherwise infers, the tree grammar used in the source document by identifying the units of repetition among the selected temporal tokens. The maximum size of the repeating units may be determined from the amount of text between subsequent selected temporal tokens. The beginning and ending boundaries for the repeating units may be inferred from:

1) the assumption that the principle of regularity also applies to the textual descriptions of events, and 2) the expectation that event boundaries are likely to correspond to certain document features (e.g. the beginning or end of a new row in a table, the beginning of text emphasized as a title or summary.)

After the step 610, control then passes to a step 612 at which the TGI harvester 220b associates text with the selected tokens according to the determined tree grammar. After the step 612, control then passes to a step 614 at which the TGI harvester 220b extracts events from the selected tokens and associated text. After the step 614, control then passes to a step 616 at which the TGI harvester 220b performs post-processing on extracted events to generate a result event set. After the step 616, control then passes to a step 618 at which the TGI harvester 220b outputs the result event set. After the step 618, processing is complete. The steps described above may be implemented via executable code stored on a computer-readable medium and/or as a system with at least one processor to perform the above-noted steps.

Another type of harvester may be known as the Two-Tiered Probabilistic harvester ("TTP harvester") 220c. The TTP harvester 220c may operate based on two tiers of processing: a first tier that classifies text information according to preselected features as potentially being desired portions of event information and applies a probabilistic weighting model to the classified text information, and a second tier that associates identified event information portions with one another to generate result event list information, that may include, for example, a start date for an event, an end date for the event and a description of the event, as further described herein.

Figure 7:
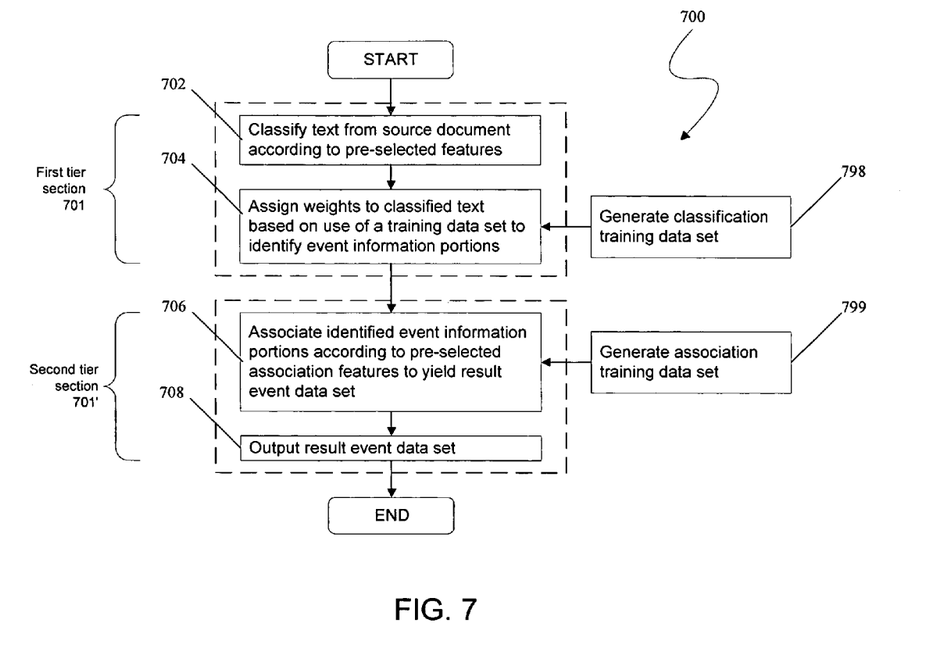
FIG. 7 is a flow diagram showing operation of the Two-Tiered Probabilistic harvester according to an embodiment of the system described herein.

FIG. 7 is a flow diagram 700 showing operation of the TTP harvester 220c according to an embodiment of the system described herein. A first functional section of the flow diagram 700 is the first tier processing section 701 and a second functional section of the flow diagram 700 is the second tier processing section 701'. As part of the first tier processing section 701, in a step 702, text from a source document is classified according to pre-selected features that may be characteristic of event information such as starting dates, ending dates and/or event descriptions. Features characteristic of event information may include style formatting, such as bolding and/or italics, words or abbreviations typically associated with date information, such as May, Mar. or Fri., and/or text formatting, such as numbers separated by slashes or dashes (number/number/number or number-number-number). Other features that identify calendar or other event information may be used.

After the step 702, control passes to a step 704 in which the probability that the classified text is desired event information is determined using weights assigned to the classified text based on the use of a generated training data set 798. The training data set 798 may be generated prior to, or as part of, the processing of the TTP harvesting algorithm described herein. The training data set contains sample event information having features as detailed above that are labeled or otherwise identified by a user as indicating event information. Accordingly, use of the training data set enables the TTP harvester 220c to assign weights to the classified text based on recognizable features. It should be noted that different training data sets may be generated and/or selected for use according to an expected data layout. The assigning of weights in the step 704 may be based on the use of a hidden markov model, such as a Maximum Entropy Markov Model that is a probabilistic tool that may be used for information extraction and text segmentation. (See, for example, A. McCallum, D. Freitag, F. Pereira, "Maximum Entropy Markov Models for Information Extraction and Segmentation," *Proc.* 17*th International Conf. on Machine Learning*, San Francisco, Calif., (2000), pp. 591-598, which is incorporated herein by reference.) A result of the step 704 is a probabilistic identification of portions of event information from the classified text.

As part of the second tier processing section 701', after the step 704, processing proceeds to a step 706 at which portions of event information identified according to the above-noted steps are associated with one another. The association of event information portions may be based on the application of another set of pre-selected features. For example, association features may include associating together all event information portions that appear on a single line of text. Within the single line, a first occurrence of event information portion classified as a date may be identified as a starting date, a second occurrence of a date event information portion may be identified as an ending portion, and a text event information portion may be identified as a description of an event. Other association features may be used. The weight applied to each association feature may be determined based on the use of a generated training data set 799. Training data set 799 may be generated prior to or as part of the processing of the TTP harvesting algorithm described herein. A result of the step 706 is an identification of one or more event listings in a result event set. After the step 706, control passes to a step 708 at which the result event set is output. After the step 708, processing is complete. The steps described above may be implemented via executable code stored on a computer-readable medium and/or as a system with at least one processor to perform the above-noted steps.

In multiple embodiments, various combinations of the above-described harvesters 220a-220d may be used in the system described herein. Additionally, various custom harvesters 220d may be used, including different configurations of the above-described harvesters that may be made according to manipulation and alteration of parameters and settings of the harvesters. For example, one type of custom harvester 220d may use the TG harvester, but force it to interpret the calendar as a column-based calendar with a specific year. Another type of custom harvester 220d may be based on specific production rules for a parsing analysis of a generally known data layout or format. A custom harvester based on production rules would essentially assume that the calendar expressed events in a context-free grammar, and could therefore be parsed as such. It would use traditional context-free grammar parsing techniques, such as constructing a token stream by recognizing tokens through regular expressions, then constructing an abstract syntax tree through production rules, then transforming that tree through various syntax and semantic analysis heuristics. For example, if it is known that a particular URL contains event information in a "35 box" month style calendar display with a single HTML table for the entire month and a single HTML table cell for each day, then a production rule harvester that operates based on production rules particular to that style may be used.

Additionally, other harvesters may used with the system described herein that incorporate other known parsing and text recognition techniques.

Once the subset of harvesters has each produced a result event list and a representation of token locations for the harvested data, the result events list and token location information from each of the contributing harvesters is transmitted to the ecologist 230. The ecologist 230 receives the information from each of the harvesters and selects at least one of the result event lists received from the harvesters 220 and/or generates a selected result event list from the multiple result event lists received from the harvesters 220 (termed, for example, the "EcoHarvest"). The ecologist 230 may generally use a heuristic (rule) based approach to selection. For example, if a specialized harvester or a particular customized harvester has been identified or generated for a particular source document, then the ecologist 230 may simply select the result event list from a custom harvester. Otherwise, the ecologist 230 may use a parameter based selection algorithm, as further described herein. Alternatively, the ecologist 230 may use a probabilistic selection approach of one or more result event lists, and/or selection of specific events from multiple result event lists, as further described herein.

In an embodiment, the ecologist 230 may build a result event list based on the most commonly-recognized events from among result event lists of the contributing harvesters. In order for the ecologist 230 to determine whether a result event list from a harvester 220 contains a given event, the ecologist 230 may determine equality of events from different result event lists. Event equality may be determined by parameterized equality comparison assessments.

The ecologist 230 may take a hash of result event lists from the harvesters 220. Each result event list may be indexed by the use of an ID of the harvester that created the result event list. For example, events in a result event list may include fields for the starting datetime of the event, an ending datetime of the the event, a description of the event, a unique identified for the event (uid), and a unique identifier for the equality assessment (equid). The uid may be used for bookkeeping within the algorithm and the database as a way to differentiate between different events. This is desirable because the data within two different events may be identical (for example, if an event was listed on a calendar twice). The equid refers to the equivalence class that contains this event, as further described elsewhere herein.

Entire fields and/or portions of fields may be compared. For example, to compare the starting date information of an event, only months may be compared within the date field. Alternatively, entire dates may be compared that may include any desired level of specification including month, day, year, hour, minute and/or second.

Thresholds may be used to assess matches between comparison fields that require string comparisons. The threshold may be a maximum threshold. For example, a comparison of description fields may be performed according to a particular match threshold (for example, an equality score of 3). Matching of the fields may be performed according to the match threshold and based on known matching algorithms including string edit distance, word-level distance, temporal distance of start / end dates and times, and/or other algorithms.

In a given ecologist operation, parameters may be set so as to be sensitive enough to maximize differences between events in a single harvester result event list while minimizing differences between events across result event lists of multiple harvesters. For example, a harvester may look for certain text characters that commonly delimit fields of data (e.g. tabs, commas, hyphens, etc). Such a harvester may accept, as a parameter, a list of suitable delimiter characters. It may be desirable to select the delimiter characters according to the nature of the calendar to be harvested.

It may be preferable for the equality test to include as few features as possible to facilitate fast operation. After determining parameters, events may be broken into equivalence classes that are represented by the most average event within that class. An equivalence class is a set of items for which each item is "equal" to each other item in that class, according to a pre-defined definition of "equal." This equality test may be called an equivalence relation. A set of items may be partitioned into equivalence classes with a given equivalence relation. Multiple harvesters may return events that differ only slightly such that for purposes of the system described herein, the events may be considered equal. In this case, events may be grouped into equivalence classes where the equivalence relation is a determination of similarity rather than strict equality. Representative events from the largest equivalence classes may be used in the selected result event list.

It should be noted that before computing event equality, a junk event algorithm may be performed that causes junk events to be ignored. If a result event list from a harvester contains a high enough percentage of junk events, the result event list of that harvester may be ignored. For example, the junk event algorithm may search the text of the event for nonsense words, long strings of non-word characters, excessive white-space, and other meaningless text. If the algorithm finds enough of this "junk" text, it may mark the event as junk.

In another embodiment, the ecologist 230 may select an appropriate harvester-generated result events list based on a simple conditional probability, that is the ecologist 230 may select a preferred or "best" event set, s, from among all event sets, S, returned by harvesters by means of a Maximum Likelihood Estimate (MLE) to generate inferences about parameters of the underlying probability distribution from the given data set:

$$s = \operatorname*{argmax}_{i \in S} Pr(C(i)|F(i),H(i))$$

where C(i) is the hypothesis that event set i is the correct event set, and F(i) is a set of features extracted from the event set i, and H(i) is all ancillary information provided by the harvester that produced event set i, and where the model of conditional probability is estimated from prior observations of <F, H, C>.

In another embodiment, the ecologist 230 may select a preferred or "best" parsed data p (harvested data) from a harvester out of the total subset of parsed data P from the subset of harvesters based on a scoring algorithm or other selection technique. In an embodiment, a scoring algorithm may be as follows.

$$\operatorname{score}(p,x) \geq \operatorname{score}(p',x) \forall p' \in P - \{p\}$$

where:

$$\operatorname{score}(x,p) = a_1 S'_{TEST}(c(x),p) + a_2 S_{TEST}(x,p) + a_3 S'_{USER}(c(x),p) + a_4 S_{USER}(x,p) + a_5 M(x,p)$$

and:
  c(x) is the taxonomical class of file x.
  $S_{TEST}(x,p)$ is the probability of correctness of p on x, as may be determined by empirical testing;
  $S'_{TEST}(C,P)$ is the probability of correctness of p on any file in class C, as may be determined by empirical testing;
  $S_{USER}(x,p)$ is the probability of correctness of p on x, as may be determined by user feedback;
  $S'_{USER}(C,p)$ is the probability of correctness of p on any file in class C, as may be determined by user feedback;
  M(x,p) is a metric of how closely the parse tree created by p on x matches the parse trees created by all $p' \in P-\{p\}$; and
  $a_i, 1 \leq i \leq 5$ are scalar constants as may be determined empirically.

After the ecologist 230 has selected an appropriate result events list from the harvested data based on the scoring algorithm or other selection method, the selected harvested data (termed, for example, the "EcoHarvest") and ancillary information is transmitted to the semantic post processor 240 which traverses the parse tree of the selected result data set and creates events objects ("event objects") in a memory, such as database 420. The event objects may correspond to each of the specific events in the harvested data, and may include the following ("event fields"): summary (for example, the first 80 characters of the description); location/venue; additional information, such as price, notes, details, for example. The semantic post processor may output the processed result event data set 242.

In an embodiment, the semantic post processor 240 may operate based on the use of Conditional Random Fields (CRFs). CRFs are a probabilistic framework for labeling and parsing structured data, such as sequences, trees, graphs and/or other data structures. (See, for example, J. Lafferty, A. McCallum, F. Pereira, "Conditional random fields: Probabilistic models for segmenting and labeling sequence data," *Proc. 18th International Conf. on Machine Learning,* San Francisco, Calif., (2001), pp. 282-289, which is incorporated herein by reference). It is noted that in other embodiments, the semantic post processor 240 may use other probabilistic parsing models. For example, the semantic post processor 240 may use hidden markov models, as further described elsewhere herein.

The harvester subsystem 200 may further include a controller 250 that controls and/or manages the harvesting process (termed, for example, the "HarvestManager"). The controller 250 may control the following tasks: receiving and processing the downloaded source file information; the preselection process; the harvesting algorithms; the ecologist selection process; and the semantic post-processing, as further discussed elsewhere herein. The controller 250 may monitor the progress of data from a particular harvester using ID information of the harvester, as further described elsewhere herein. The ID information may also be used to help the controller distinguish between the result event data from each of the harvesters and the result event data that is finally selected by the ecologist 230. The controller 250 may include an application programming interface (API) that allows for external input and control of the harvesting process. The controller 250 may call harvesting process functions described herein and pass the returned values of those functions on to subsequent functions. As the controller 250 does this, it may keep track of the progress of the harvesting process in a record which may be accessed through the API. In another embodiment, the controller 250 may be a stand-alone component outside of the harvester subsystem 200.

After the harvester subsystem 200 has selected a result events list, the result events list may be transmitted to the user interface. The user interface 310 may enable users to edit the event objects in a result events list. The editing may include correcting any incorrectly harvested event objects, changing event objects, and adding event objects. The user interface 310 may also enable the user to specify software systems to which the event objects may be exported (such as on-line calendars and PIM systems). In addition, the user interface may allow for the batch editing of certain event attributes, such as time zone, location, or event notes. The user interface 310 also provides a system in which the user may specify that the harvested data be 'monitored' for changes, additions, or deletions on the source document, called the live harvest module 320.

The live harvest module 320 may periodically poll a webpage to see if the webpage has been changed. If so, the harvest process described herein is applied again to the webpage in order to generate a new set of events. The results of that harvest process are then compared with the results of previous harvests from that webpage based on metrics designed to gauge human acceptability. The comparison algorithm may be a greedy pairwise matching algorithm; the algorithm finds the most closely matching pair of events between the two sets, then iteratively finds the next most closely matching pair of events until the most closely matching pair is deemed too dissimilar. In comparing each event with each other event, the algorithm may weigh certain differences, like a change in the year, more heavily than others, like the addition of a few words to the description or a change in duration. The results of the comparison may then be summarized for the user in an email and presented to the user for verification. The user may then have the option of accepting the changes suggested by the comparison algorithm, adding modifications, or rejecting the changes through the user interface 310.

In another embodiment, the processed result event data set 242 may be transmitted directly and/or automatically to the destination PIM software, web page or other data format destination without being transmitted to the user interface 310 for user review. In such an embodiment, events transmitted automatically may be filtered by certain event attributes, such as date or keyword.

The processed result event data set 242 from the harvester subsystem 200 and/or information from the user interface subsystem 300 may be transmitted to the data subsystem 400. The statistical analyzer 410 of the data subsystem 400 may be used for multiple purposes, including: to help retrain the ecologist 230 and to provide data and reports on aggregate user behavior. In order to retrain the ecologist 230, the statistical analyzer 410 may look at direct feedback on the correctness of the set of events generated by a given harvester or indirect feedback, such as the rate at which those events were exported to one of the output data formats 120. The results of these analyses may be communicated to the ecologist 230 in the form of feedback data. In addition, the statistical analyzer 410 may generate data, either for other software applications or for interested persons, regarding the popularity of harvests by time unit (day, month, etc.), the popularity of harvests by geographic region, the popularity of harvests containing specific keywords, calendar software application market shares, correlations between user demographic data and various user behaviors, and correlations between user behaviors and other user behaviors.

Figure 8:
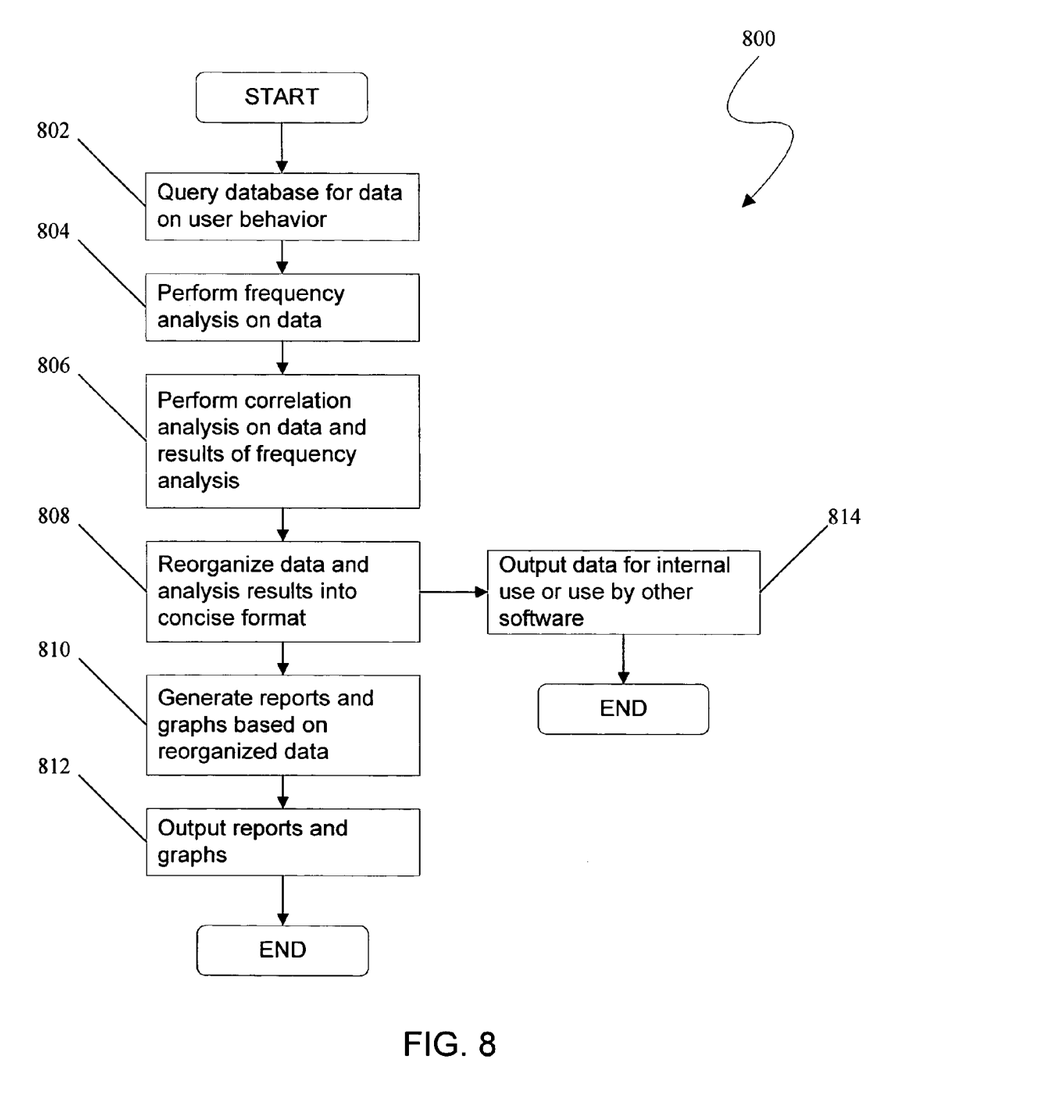
FIG. 8 is a flow diagram showing operation of the statistical analyzer according to an embodiment of the system described herein.

FIG. 8 is a flow diagram 800 showing operation of the statistical analyzer 410 according to an embodiment of the system described herein. At a step 802, the statistical analyzer 410 queries the database 420 for data on user behavior. After the step 802, control passes to the step 804 at which the statistical analyzer 410 performs a frequency analysis on the data. After the step 804, control passes to a step 806 at which the statistical analyzer 410 performs correlation analysis on the data and the results of the frequency analysis. After the step 806, control passes to a step 808 at which the data and analysis results are reorganized into a concise format. After the step 808, control passes to at least one of two parallel operational branches. That is, at a step 810, the statistical analyzer 410 may generate reports and/or graphs based on the reorganized data. At a step 812, the statistical analyzer 410 outputs the reports and/or graphs. In parallel, after the step 808, processing may also proceed to a step 814 at which statistical analyzer 410 outputs data for use by other software. After the steps 812 and 814, processing is complete.

The steps of any of the algorithms described above may be implemented via executable code stored on a computer-readable medium and/or as a system with at least one processor to perform the above-noted steps.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. An event data translation system comprising:
   at least one processor;
   an interface executed by the at least one processor for receiving input information;
   at least one harvester that is selected from a plurality of harvesters and that is executed by the at least one processor for parsing event data from the input information to generate at least one result event data set;
   an analyzer executed by the at least one processor for analyzing the at least one result event data set outputted from the at least one harvester and selecting at least a portion of the at least one result event data set based on the analysis of the at least one result event data set as a selected result event data set;
   a processing component executed by the at least one processor for processing the selected result event data set to generate an event listing,
   a statistical analyzer executed by the at lest one processor for analyzing use of the event listing, wherein the event listing is displayed via the interface,
   wherein the statistical analyzer provides user feedback data about the event listing and uses the user feedback data to provide further information for configuring the analyzer in connection with analysis of a subsequent result event data set from the at least one harvester and selection of a subsequent selected result event data set, and wherein the user feedback data about the event listing is used in a subsequent selection of the at least one harvester from the plurality of harvesters; and
   at least two harvesters of the plurality of harvesters executed by the at least one processor for parsing event data from the input information to generate a result event data set as a plurality of result event data sets, wherein the analyzer analyzes the plurality of result event data sets and selects at least a portion of the plurality of result event data sets as a selected result event data set and wherein the at least two harvesters include a harvester of a first type having a first setting and a harvester of the first type having a second setting, the first setting being different from the second setting,
   wherein at least one of: the at least one harvester, the analyzer and the processing component is coupled to a controller for controlling at least one of: the at least one harvester, the analyzer and the processing component.

2. The event data translation system according to claim 1, further comprising:
   a pre-selector that selects the at least one harvester from the plurality of harvesters.

3. The event data translation system according to claim 1, wherein the at least one harvester includes a harvester of a type that is at least one of: a table grammar harvester, a tree grammar inference harvester, and a two-tiered probabilistic harvester.

4. The event data translation system according to claim 1, wherein the interface is a user interface.

5. The event data translation system according to claim 1, wherein the input information is at least one of: an e-mail, a webpage, a text file and a pdf file.

6. The event data translation system according to claim 1, further comprising:
   at least one of: an HTML receiver and an HTML converter, wherein the input information is either received in an HTML format by the HTML receiver or converted into an HMTL format by the HTML converter.

7. The event data translation system according to claim 1, further comprising:
   a monitor that monitors changes in a source of the input information.

8. The event data translation system according to claim 1, wherein the user feedback data is provided to the analyzer from a user via the interface.

9. The event data translation system according to claim 1, wherein the statistical analyzer provides information concerning the use of the event listing as the user feedback data to the analyzer.

10. The event data translation system according to claim 1, wherein a result of analyzing the use of the event listing is provided as the user feedback data.

11. A method for translating event data, comprising:
    using at least one processor to perform steps of:
    receiving input information via an interface executed by the at least one processor;
    selecting at least one harvesting algorithm from a plurality of harvesting algorithms;
    performing the at least one selected harvesting algorithm on the input information to generate a result event data set;
    analyzing the result event data set outputted from the at least one selected harvesting algorithm; and
    selecting at least a portion of the result event data set based on the analysis of the result event data set as a selected result event data set by executing an analyzer;
    generating an event listing from the selected result event data set by executing a processing component;
    analyzing use of the event listing and displaying the event listing via the interface; and
    receiving user feedback data about the event listing, wherein the user feedback data is used to provide further information for configuring the analyzer in connection with analysis of a subsequent result event data set from the at least one harvesting algorithm and selection of a subsequent selected result event data set, and wherein the user feedback data about the event listing is used in a subsequent selection of the at least one harvesting algorithm from the plurality of harvesting algorithms;
    performing at least two harvesting algorithms from the plurality of harvesting algorithms on the input information to generate a plurality of result event data sets, wherein the at least two harvesting algorithms include a harvest of a first type having a first setting and a harvest of the first type having a second setting, the first setting being different from the second setting; and
    analyzing the plurality of result event data sets and selecting at least a portion of the plurality of result event data sets as a selected result event data set,
    wherein at least one of: the at least one harvester, the analyzer and the processing component is coupled to a controller for controlling at least one of: the at least harvester, the analyzer and the processing component.

12. The method according to claim 11, wherein the at least one harvesting algorithm includes a harvesting algorithm of a type that is at least one of: a table grammar harvesting algorithm, a tree grammar inference harvesting algorithm, and a two-tiered probabilistic harvesting algorithm.

13. The method according to claim 11, wherein the user feedback data is user feedback on the event listing that is farther used to improve the at least one harvesting algorithm.

14. The method according to claim 11, wherein the input information is at least one of: an e-mail, a webpage, a text file and a pdf file.

15. The method according to claim 11, farther comprising: at least one of: receiving the input information in an HTML format and converting the input information into an HTML format.

16. The method according to claim 11, farther comprising: monitoring changes in a source of the input information.

17. The method according to claim 11, wherein the user feedback data is received from a user via a user interface.

* * * * *